(12) United States Patent
Castro, Sr.

(10) Patent No.: US 10,641,095 B2
(45) Date of Patent: May 5, 2020

(54) ENERGY CONVERSION DEVICE

(71) Applicant: Christopher J Castro, Sr., Brentwood, NY (US)

(72) Inventor: Christopher J Castro, Sr., Brentwood, NY (US)

(*) Notice: Subject to any disclaimer, the term of this patent is extended or adjusted under 35 U.S.C. 154(b) by 0 days.

(21) Appl. No.: 15/582,838

(22) Filed: May 1, 2017

(65) Prior Publication Data

US 2017/0350254 A1 Dec. 7, 2017

Related U.S. Application Data

(60) Provisional application No. 62/345,529, filed on Jun. 3, 2016.

(51) Int. Cl.
*F01D 5/02* (2006.01)
*F03D 1/06* (2006.01)
(Continued)

(52) U.S. Cl.
CPC .............. *F01D 5/023* (2013.01); *F03B 3/126* (2013.01); *F03B 13/105* (2013.01); *F03B 17/061* (2013.01); *F03D 1/0625* (2013.01); *H02J 7/34* (2013.01); *H02K 7/1838* (2013.01); *F05B 2210/16* (2013.01); *F05B 2220/7068* (2013.01); *F05B 2230/60* (2013.01); *F05B 2240/221* (2013.01); *F05B 2240/30* (2013.01); *F05B 2250/292* (2013.01); *F05B 2250/71* (2013.01); *F05B 2250/712* (2013.01); *F05D 2260/42* (2013.01); *H02K 21/24* (2013.01); *Y02E 10/22* (2013.01); *Y02E 10/223* (2013.01);
(Continued)

(58) Field of Classification Search
CPC ........ F01D 5/023; F03B 17/061; F03B 3/126; F03B 13/105; H02K 7/1838; H02K 21/24; F03D 1/0625; H02J 7/34; F05B 2250/292; F05B 2250/25; F05B 2210/16; F05B 2250/712; F05B 2250/71; F05B 2240/30; F05B 2240/221; F05B 2230/60; F05B 2220/7068; F05B 70/527; Y02E 10/721; Y02E 10/223; Y02E 10/22; Y02E 10/725; Y02E 10/28; Y02E 10/766; F05D 2260/42; Y02P 70/523; Y02P 70/527; Y02P 70/525

See application file for complete search history.

(56) References Cited

U.S. PATENT DOCUMENTS

| 4,368,007 A * | 1/1983 | Ely .................. F03D 1/0608 416/121 |
| 8,851,828 B2 * | 10/2014 | Zhang ................ F03D 1/0608 415/4.1 |

(Continued)

*Primary Examiner* — Michael C Zarroli

(57) ABSTRACT

Some embodiments include a mounting system for mounting the device in a fluid, an axle fixed to the mounting system, a solid walled hollow body that rotates about the axle having axial symmetry about a longitudinal axis. The solid walled hollow body may be substantially rounded at the front, expanding to a maximum diameter less than half the distance from the front end to the back end, and tapering radially along the longitudinal axis to the back end. The energy device may further comprise a plurality of blades on the exterior of the hollow body, each blade extending from the front end of the solid walled hollow body to the back end, rising to a maximum height, and having concave and convex walls.

6 Claims, 9 Drawing Sheets

(51) Int. Cl.
  *F03B 17/06* (2006.01)
  *H02K 21/24* (2006.01)
  *F03B 3/12* (2006.01)
  *F03B 13/10* (2006.01)
  *H02J 7/34* (2006.01)
  *H02K 7/18* (2006.01)

(52) U.S. Cl.
  CPC .............. *Y02E 10/28* (2013.01); *Y02E 10/721* (2013.01); *Y02E 10/725* (2013.01); *Y02E 10/766* (2013.01); *Y02P 70/523* (2015.11); *Y02P 70/525* (2015.11); *Y02P 70/527* (2015.11)

(56) References Cited

U.S. PATENT DOCUMENTS

| | | | |
|---|---|---|---|
| 9,328,713 B2 * | 5/2016 | Beaston | F03B 3/14 |
| 2008/0075599 A1 * | 3/2008 | Miller | F03D 1/0608 |
| | | | 416/182 |
| 2009/0196763 A1 * | 8/2009 | Jones | F03D 3/005 |
| | | | 416/90 R |
| 2010/0278650 A1 * | 11/2010 | Parker | F03D 1/0633 |
| | | | 416/176 |
| 2011/0027084 A1 * | 2/2011 | Rekret | F03D 3/02 |
| | | | 416/126 |
| 2012/0183407 A1 * | 7/2012 | Vallejo | F03D 3/061 |
| | | | 416/228 |
| 2013/0343891 A1 * | 12/2013 | Rajakaruna | F01D 5/023 |
| | | | 416/176 |

* cited by examiner

ENERGY CONVERSION DEVICE

This application claims the benefit of U.S. Provisional Application 62/345,529.

BACKGROUND

Methods for capturing kinetic energy in moving fluids, both compressible such as wind and incompressible such as water, have existed for thousands of years ranging from Heron of Alexandria's wind power machines and water wheels and the Archimedes screw in ancient Greece to modern wind turbines and hydro power generators in use today. Similarly, machines that increase the kinetic energy of, i.e. move, fluids such as fans and propellers by conversion of another form of energy into rotational energy have also existed for thousands of years. Both types of devices typically share blades and a rotating body to which the blades are attached as common design elements.

The deployment and operation of modern wind turbines are plagued by a number of issues such as, for example, vibration, noise, unsightliness, large ground footprints to accommodate high towers for mounting turbines, and potential impact on local environments for larger installations. Some of these issues are caused by the length of the blades required for conventional turbines which directly affects vibration and noise as well as limit the wind speed range in which a turbine may safely operate and produce power.

At the same time, many hydropower installations require diversion of the water supply to feed the turbine in specialized pipes and other structures. The effectiveness of these turbines is also limited by blade design and their configuration on the rotating portion of the turbine. The effectiveness of propellers for propulsion, fans and other devices that convert mechanical energy into fluid movement are similarly affected by blade design and their mounting on the rotating body.

Therefore, a solution which improves the transfer or conversion of energy between fluid motion and mechanical rotation and possibly other forms of energy such as electricity is desirable.

SUMMARY OF THE INVENTION

The present inventive subject matter is directed to an energy conversion device for converting energy between mechanical rotation or other form of energy such as electricity and fluid motion.

In a first illustrative embodiment, the energy conversion device may include a mounting system for mounting the device in a fluid, an axle fixed to the mounting system, a hollow shell that rotates about the axle and having axial symmetry about a longitudinal axis. The hollow shell may be substantially rounded at the front, expanding to a maximum diameter less than half the distance from the front end to back end, and tapering radially along the longitudinal axis to the back end. The energy device may further comprise a plurality of blades on the exterior of the hollow shell, each blade extending from the front end of the hollow shell to the back end, rising to a maximum height, and having concave and convex walls.

In a second illustrative embodiment, the energy device may additionally comprise an interior space with a generator housed in the interior space. The generator may further comprise a rotor fixed to the hollow shell and a stator fixed to the axle.

A third illustrative embodiment of the present inventive subject matter may be a turbine and may include a mounting system for mounting the device in a fluid, an axle fixed to the mounting system, a hollow shell that rotates about the axle and having axial symmetry about a longitudinal axis. The hollow shell may be substantially rounded at the front, expanding to a maximum diameter less than half the distance from the front end to back end, and tapering radially along the longitudinal axis to the back end. The energy device may further comprise a plurality of blades on the exterior of the hollow shell, each blade extending from the front end of the hollow shell to the back end, rising to a maximum height, and having concave and convex walls. The turbine may also further comprise one or more bearing assemblies fixed to the hollow shell for allowing the hollow shell to rotate about the axle.

Further objects, features, and advantages will be apparent from the following detailed description, and taking into consideration the attached drawing figures.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
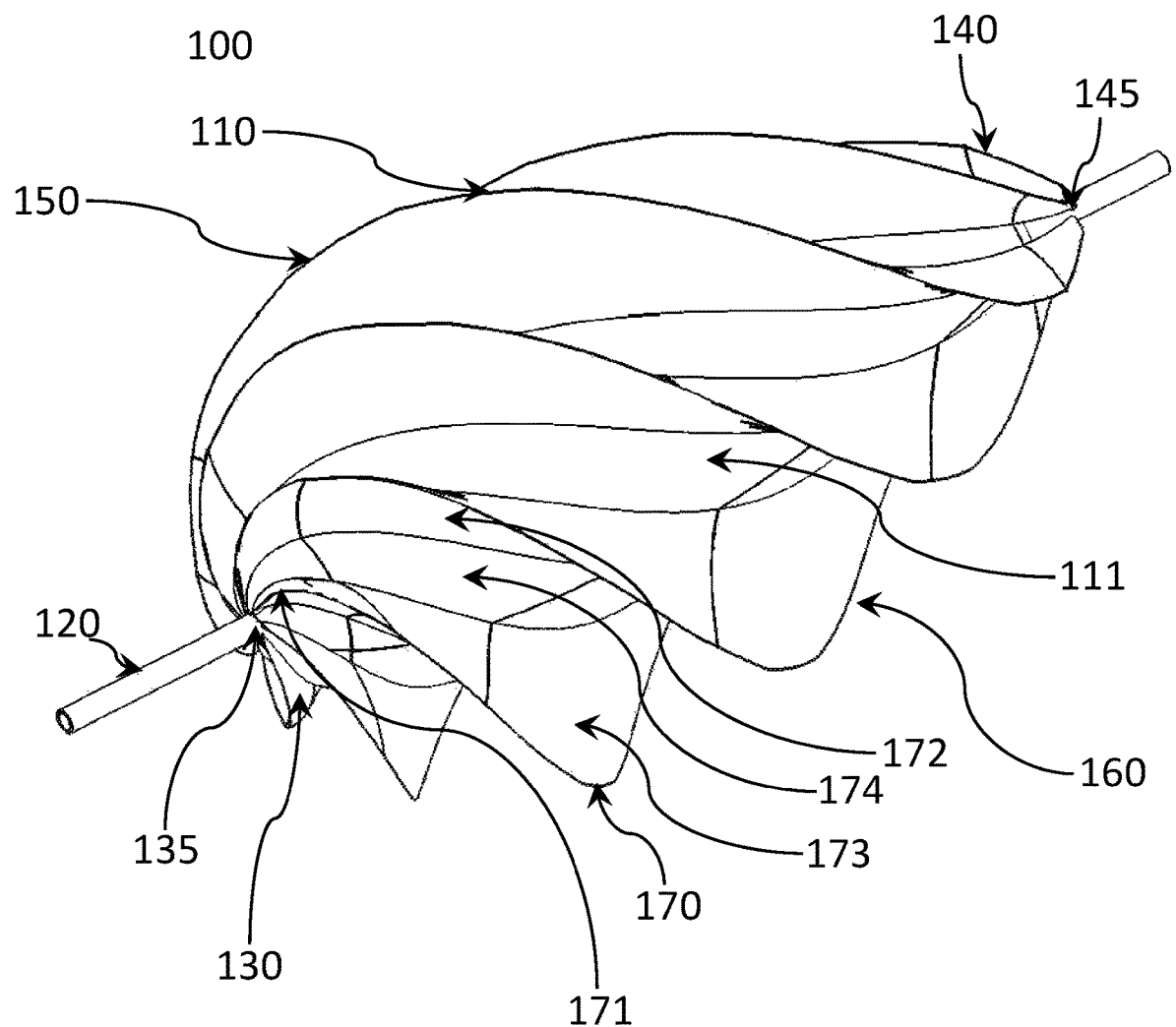
FIG. 1 shows an embodiment of the energy conversion device from an isometric point of view.

It be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing the term fluid refer to a substance that has no shape and is able to flow easily. As such, fluids may include both liquids such as, for example, water and gases such as, for example, air.

As used herein, a turbine is a device for extracting energy from a fluid and converting it to useful work, such as for example, the rotation of a shaft. In some embodiments, the present inventive subject matter may comprise a turbine. In other embodiments, the present inventive subject matter may comprise a turbine and a generator, i.e. a turbo generator, which, may extract energy and convert it to electricity, although the invention is not limited in this respect. In other embodiments, the present inventive subject matter may also convert the rotational energy of a shaft to a surrounding fluid thereby imparting momentum to the fluid to, for example, provide propulsion or direct some of the fluid in a particular direction.

Furthermore, as used herein, the golden ratio is mathematically expressed as a proportion of two quantities such that the ratio of the smaller quantity to the larger quantity is equal to the ratio of the larger quantity to the sum of the two quantities, although there are other expressions as well. This number is approximately 1.618034, but as used herein may refer to a number that approaches the value of this ratio. The ratios of increasing consecutive numbers in the Fibonacci series are an example of a set of numbers that approach the value of this ratio. In nature, the golden ratio appears in for example, generating the spiral pattern of sea shells, the proportional dimensions of dolphins, and the dimensions of hurricanes. This proportionality may, therefore, be considered to have inherent natural properties when used for design purposes.

Some embodiments of the invention may provide a device for converting fluid energy into rotational energy such as, for example, a turbine. Other embodiments may further convert the rotational energy into electrical energy such as in, for example, a turbo electric generator. Further embodiments of the invention may convert rotational energy into fluid movement such as in, for example, a propulsion system. In some of these embodiments, the input maybe electrical energy which may first be converted into rotational energy.

Figure 4:
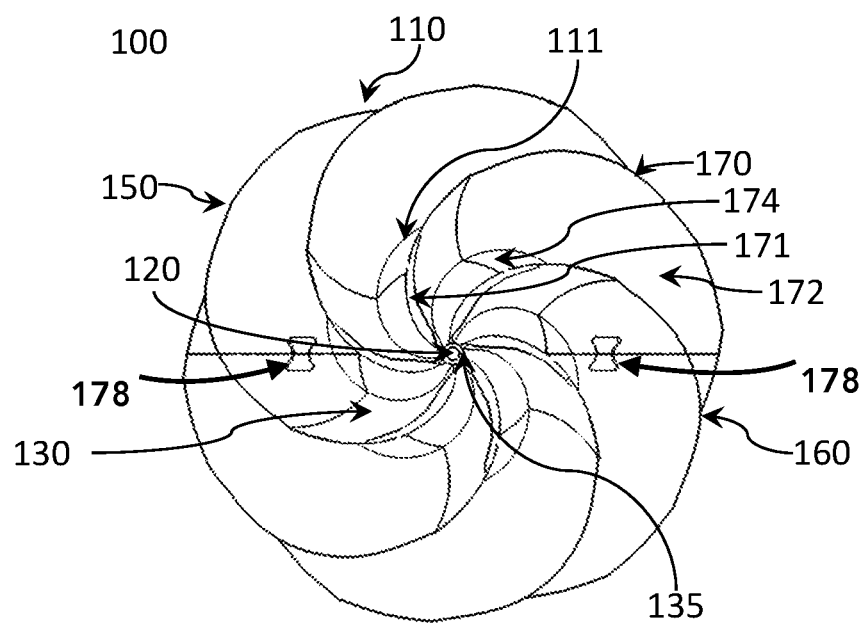
FIG. 4 is a front end view of an embodiment of the energy conversion device.
Figure 5:
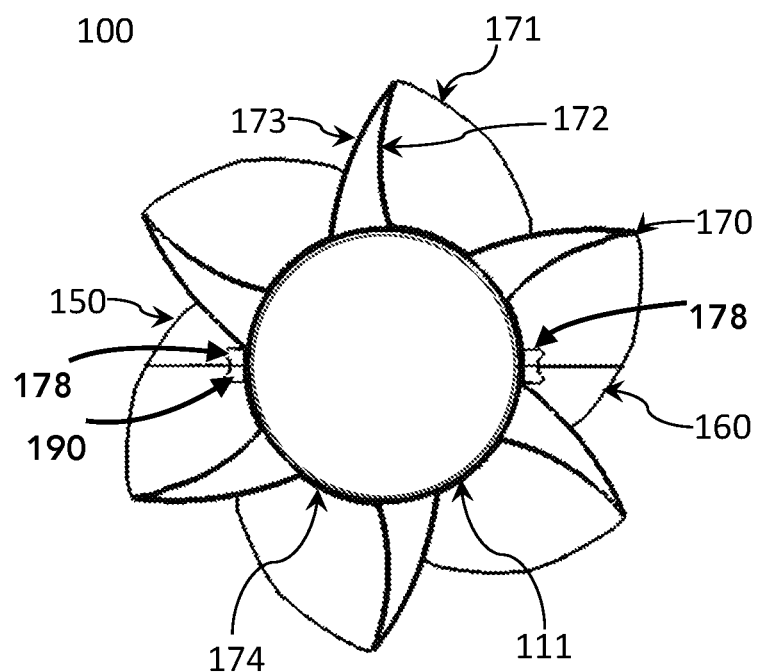
FIG. 5 is a cross-sectional front view of an embodiment of the energy conversion device.
Figure 6:
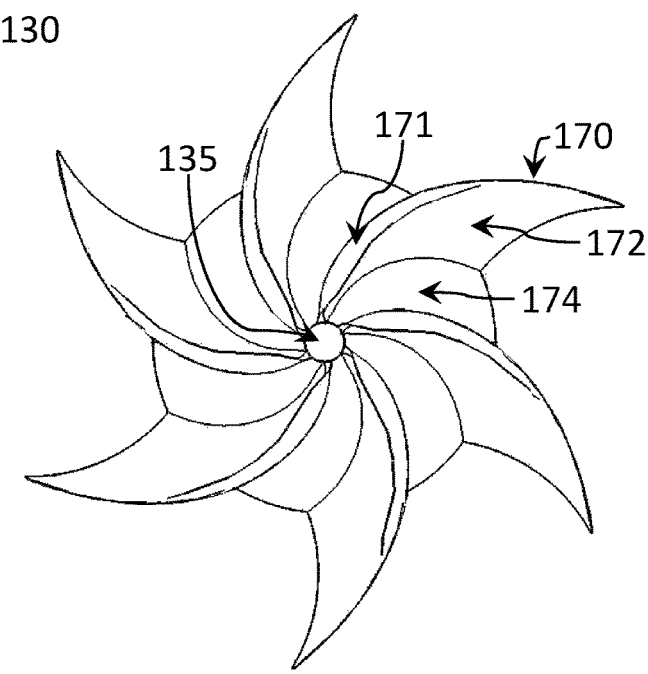
FIG. 6 shows a front end piece according to an embodiment of the energy conversion device.
Figure 7:
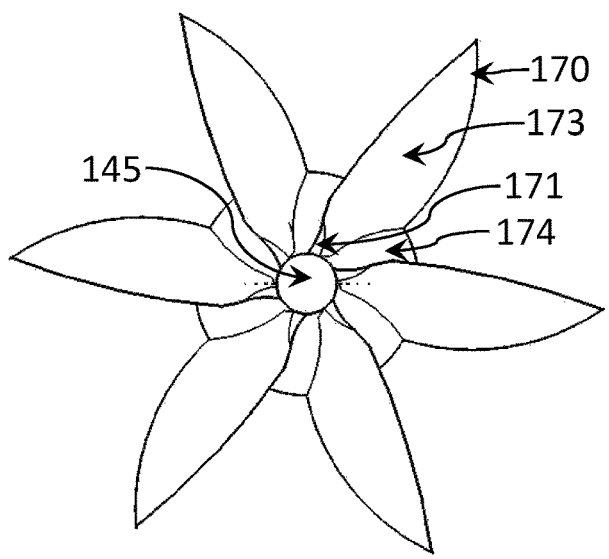
FIG. 7 shows a back end piece according to an embodiment of the energy conversion device.
Figure 8:
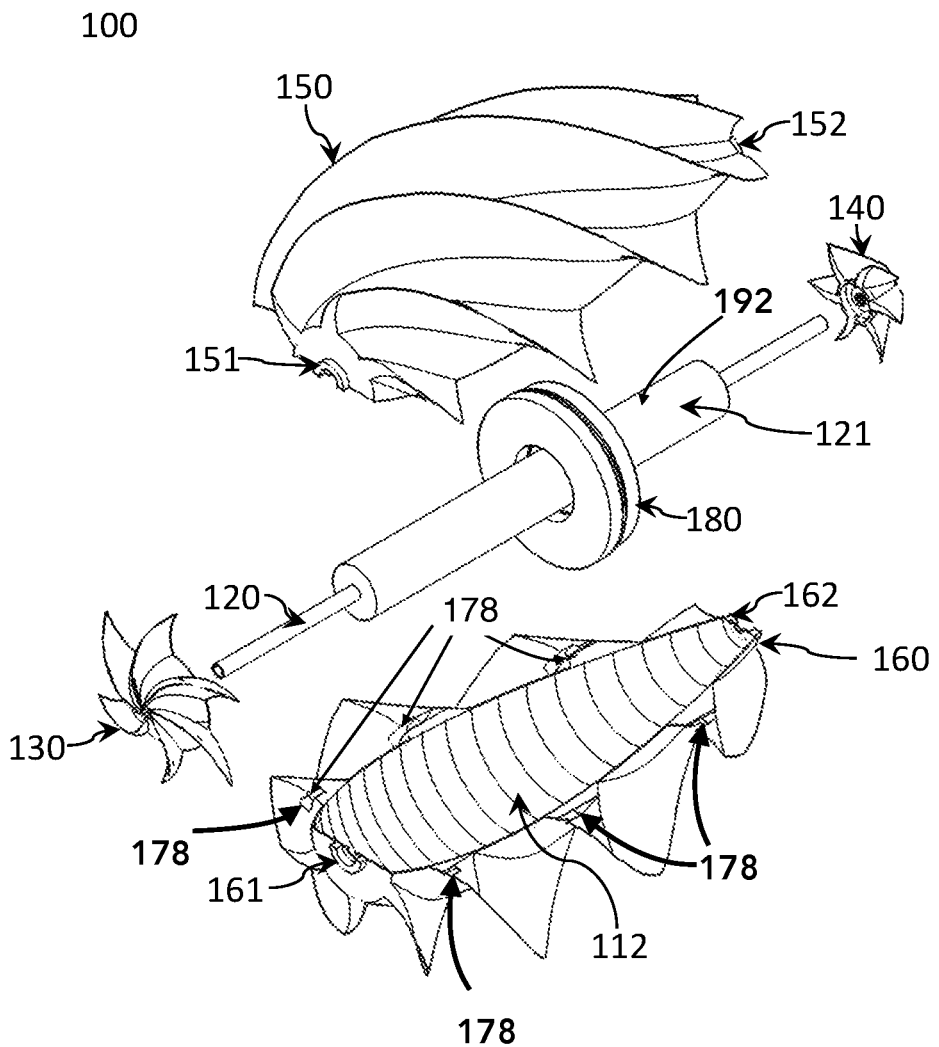
FIG. 8 is an exploded view according to an embodiment of the energy conversion device.
Figure 9:
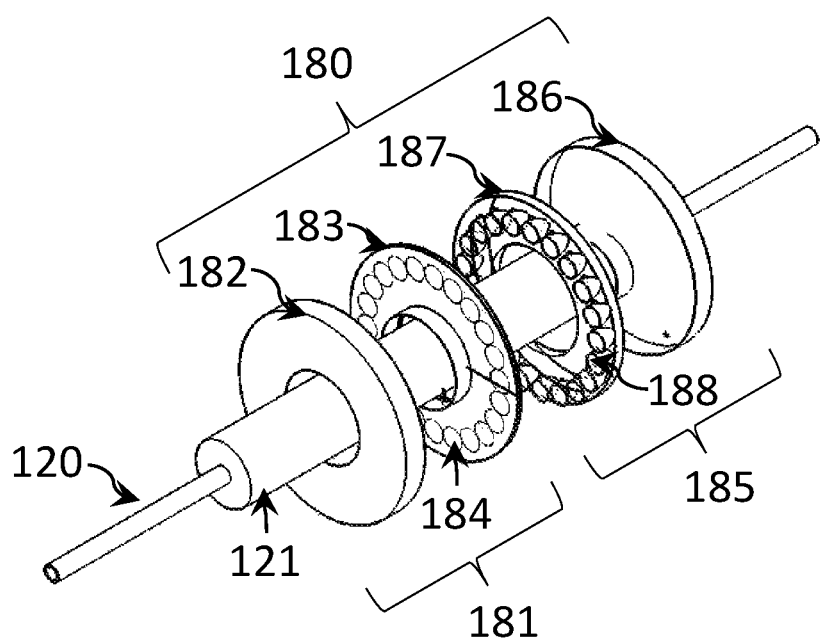
FIG. 9 is an exploded view of internal elements according an embodiment of the energy conversion device.

FIGS. 1-5 show multiple views of one embodiment of the present energy conversion device, FIGS. 6 and 7 show specific elements of the device, FIG. 8 shows an exploded view of the device, and FIG. 9 shows an exploded view of several elements of the device. It should be noted that no single view in these figures shows all elements of the device, although many elements appear in multiple views, and for clarity not all elements may be indicated in each figure. FIG. 1 shows one embodiment of the present energy conversion device 100 from an isometric point of view comprising a central body 110 capable of rotation about central axle 120 having a hollow shell 111 and 2 or more blades 170, forming 2 or more channels 174 between blades. Hollow shell 111 may comprise front end piece 130, front end orifice 135 for accommodating central axle 120, a back end piece 140, back end orifice 145 for accommodating central axle 120, first half piece 150, and second half piece 160. Each blade 170 has a blade top surface 171, a clockwise (CW) facing wall 172 which faces the approaching fluid and a counterclockwise (CCW) facing wall 173 when viewed from the front end, i.e. the direction from which the fluid is incoming although the invention is not limited in this respect.

Figure 2:
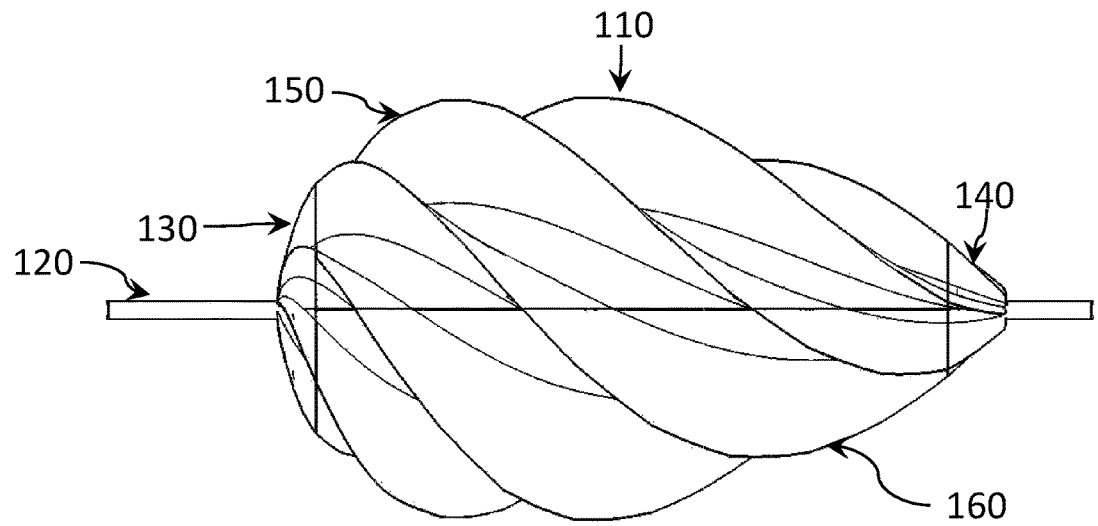
FIG. 2 is a side view of an embodiment of the energy conversion device.

In some embodiments, to facilitate assembly of the turbine, hollow shell 111 may comprise four parts: front end piece 130, back end piece 140, first half piece 150 and second half piece 160 that may be joined together possibly with other elements for the operation of energy conversion device 100. These four parts are also illustrated in FIG. 2 which depicts a side view of the same embodiment of the energy conversion device. Hollow shell 111 may also comprise other numbers of parts such as, for example, four quarter pieces with two end caps or two halves with no end caps. In other instances, the number of parts may correspond and be split along, for example, the center line of each blade. In yet other instance, the number of parts may be split along the base of the blades. Other configurations for hollow shell 111 are also possible. It should be noted that for other embodiments in which hollow shell 111 is comprised of a plurality of pieces, parts of blades 170 may be included in or affixed to each of the pieces as may be apparent in the exploded view of FIG. 8.

Figure 3:
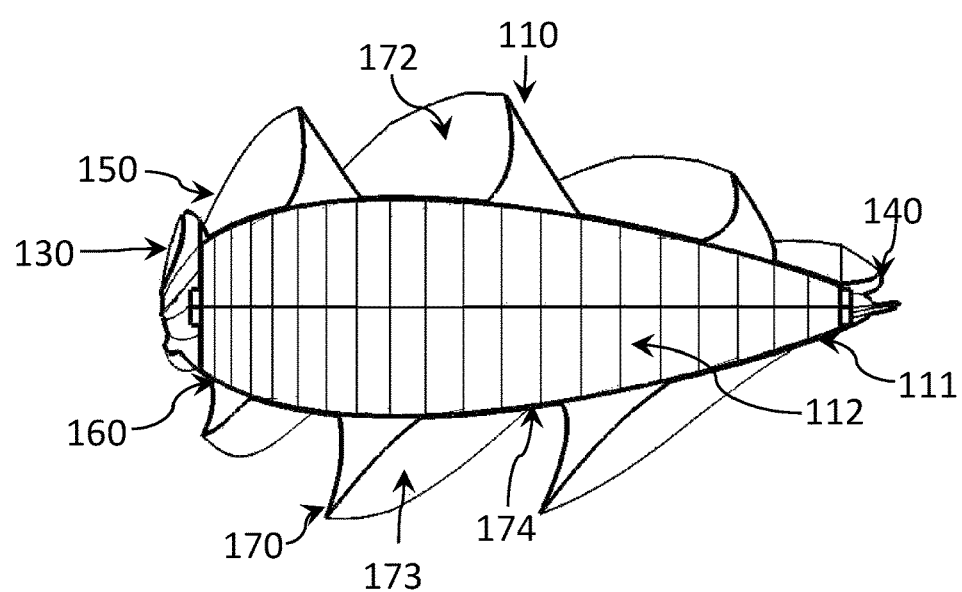
FIG. 3 is a cross-sectional side view according to an embodiment of the energy conversion device.

The configuration of these elements, front piece 130, back piece 140, first half piece 150, and second half piece 160, also appears in FIG. 3 in a cross-sectional side view for the same embodiment as in FIG. 1. Also visible in FIG. 3 is interior space 112 of solid walled hollow cavity shell 111. FIG. 4 depicts a front end view of the same embodiment as in FIG. 1, although back end piece 140, back end orifice 145, and CCW facing wall 173 are not visible from this perspective.

Although for the presently described embodiment, central axle 120 extends out through front end piece 130 and back end piece 140, in other embodiments, central axle 120 may extend only from central body 110 at either front end piece 130 or back end piece 140. For some embodiments in which the presently described energy conversion device is used to convert mechanical rotation into fluid momentum, central axis 120 may extend only from front end piece 130 of central body 110.

The shape of central body 110 and hollow shell 111 may be radially symmetric about a longitudinal axis. In some embodiments, the diameter of hollow shell 111 may vary along the axial length of central body 110 according to a continuous function. As can be seen in FIGS. 1, 2, and 3, the tip of front end piece 130 may be pointed or rounded or other shape and may include front end orifice 135 designed to accommodate central axle 120 with the diameter of front end piece 130 increasing in the axial direction. In embodiments for which different sets of parts form hollow shell 111, the front end may be shaped similarly and may also include an orifice for accommodating a central axle.

In some embodiments, the diameter of hollow shell 111 may increase continuously until it reaches a maximum diameter. In a preferred embodiment, the maximum diameter is reached less than half the distance along the axial length of central body 110 from the front end to the backend with the diameter of hollow shell 111 continuously decreasing to the tip of back end piece 140. The tip of back end piece 140 may be pointed or rounded or other shape and may include back end orifice 145 for accommodating central axle 120. In embodiments for which different sets of parts form hollow shell 111, the back end may be shaped similarly and may also include an orifice for accommodating a central axle.

In embodiments for which the maximum diameter occurs less than halfway along the axial length of central body 110, the shape of hollow shell 111 may resemble that of a teardrop, i.e., substantially rounded from the front end, expanding radially along the longitudinal central axis up to the maximum diameter and tapering radially along the longitudinal central axis from the maximum diameter to the back end. For these embodiments, the design of central body 110 may be considered a form of biomimicry of fish shapes such as dolphins and whales. Studies by the US Navy have shown the teardrop shape to be the most efficient in terms of minimizing turbulence in fluid flow around the shape and has been employed in submarine hull design (see for example "US S Albacore, a Revolution by Design" by Mark McKellar, www.hazegray.org/navyhist/albacore.htm). Other studies have shown that there is less drag for a prolate spheroid versus a rounded shape (Scientific American, November 2010, "What Do a Submarine, a Rocket, and a Football All Have in Common?"). The teardrop shape may be considered one of the numerous advantages of these preferred embodiments of the present energy conversion device.

In some embodiments, the teardrop shape of preferred embodiments of the presently described energy conversion device may be more elongated to match for example, the viscosity, and other properties of the fluid being acted upon. In others, the teardrop shape may be modified based on the function of the presently described energy conversion device. For example, when configured for operation as a wind turbine the present invention may have a different elongation and other properties than when configured for operating as water-based turbine or water-based propulsion device.

In some embodiments, two or blades 170 may extend either the full length or close to the full length of central body 110 on the exterior of hollow shell 111. For the embodiment of FIGS. 1-5, the present invention comprises six blades 170 extending from front end piece 130 to back end piece 140. In some preferred embodiments, blades 170 may be evenly spaced around the circumference of hollow shell 111, although the invention is not limited in this respect. Other numbers of blades 170 and their respective spacing may differ.

FIG. 6 shows front end piece 130 from the viewpoint of the fluid approaching energy conversion device 100 for the same embodiment of the present invention as FIGS. 1-5. In the view of FIG. 6, front end orifice 135, blades 170 with blade top surface 171 and CW facing wall 172 visible, and channels 174 are all visible. As can be seen in FIG. 6, the leading edge of blades 170 may begin at front end orifice 135 with blade top surface 171 varying axially. At front end orifice 135, blade top surface 171 may be narrow, then wider, and then diminishing in width to being a narrow or pointed ridge. In some embodiments, blade top surface 171 for each blade 170 may be a ridge along most of the axial length of central body 110, although the present invention is not limited in this respect. In other embodiments, blade top surface 171 may for example, be rounded for some or all of the length of blades 170. Other width profiles for blade top surface 171 are also possible.

FIG. 7 shows back end piece 140 from the viewpoint of the fluid leaving energy conversion device 100 for the same embodiment of the present invention as FIGS. 1-6. In the view of FIG. 7, back end orifice 145, blades 170, blade top surface 171, CCW facing wall 173, and channels 174 are all visible. In some embodiments, blade top surface 171 may be narrow and widen when approaching back end orifice 135, although the present invention is not limited in this respect. Other variations for blade top surface 171 are also possible.

For some preferred embodiments, the dimensions, orientation, and angular location of each blade 170 may be configured to optimize the transfer of energy between energy conversion device 100 and the fluid with which it interacts. For example, in the embodiment of FIGS. 1-7, blades 170 spiral in a clockwise direction when viewed from the front of central body 110 along the axial direction of central body 110. Although not limited in this respect, the total angular displacement of or arc circumscribed by each blade as it spirals along the exterior of hollow shell 111 may be approximately 240°. In other embodiments the total angular displacement may be approximately 295°. Other angular displacements are also possible. The height, thickness, curvature of CW facing wall 172, curvature of CCW facing wall 173, and, as mentioned above, shape of blade top surface 171 may vary along the axial direction of central body 110. Furthermore, at a given axial location along central body 110, the height, thickness, curvature of CW facing wall 172, curvature of CCW facing wall 173, and shape of blade top surface 171 may vary in the radial direction as well. The axial cross-section of FIG. 5 shows all of these elements at a representative axial distance from the front of central body 110 in cross-sections of blades 170 along with a cross-section of hollow shell 111.

To improve rotation when energy conversion device 100 is used, for example, as a turbine, a radial cross section of each of blades 170 may resemble an airfoil with CW facing wall 172 being the lower surface of the airfoil and CCW facing wall 173 being the upper surface of the airfoil. To improve the lift and drag characteristics of blades 170, the curvatures of CW facing wall 172 and CCW facing wall 173 at a given radial distance from the central axle 120 may be different such that, for example, CW facing wall 172 may be concave axially with respect to the front end of central body 110 and CCW facing wall 173 may be convex axially with respect to the front end of central body 110. Furthermore, to retain more fluid in channel 174, CW facing wall 172 may also be concave radially inward along some or all of the axial direction of central body 110. To improve drag characteristics for rotation, CCW facing wall 173 may be convex radially outward along some or all of the axial direction of central body 110. In other embodiments, the curvature of CW facing wall 172 and CCW facing wall 173 may be reversed such that CW facing wall 172 is convex both radially and axially, and CCW facing wall 173 is concave both radially and axially. This curvature of blades 170 along both axial and radial directions is an advantage of energy conversion device 100 over the prior art in that the three dimensional curvature may prolong fluid flow along central body 110 and increase lift characteristics of blades 170 while reducing drag characteristics of central body 110. The combined effect of this blade curvature and the teardrop shape of hollow shell 111 may act to increase energy transfer between the fluid and energy conversion device 100 when compared to prior art devices.

FIGS. 4 and 6 also show that the angle of attack or pitch at the leading edge of blades 170 may be small or zero in one preferred embodiment. FIG. 7 shows that the trailing edge of blades 170 may have a nonzero angle relative to axial direction of central body 110. In some preferred embodiments, these angles may be optimized to improve fluid flow.

In the preferred embodiment of FIGS. 1-7, the height of blades 170 may vary along the axial direction of central body 110 in a continuous manner, reaching a maximum height at the same axial location as the maximum diameter of hollow shell 111, and diminishing toward the back of hollow shell 111, although the invention is not limited in this respect. In other embodiments, the maximum height of blades 170 may not be axially coincident with the maximum diameter of hollow shell 111 and may be located closer to the front or back of hollow shell 111. Furthermore, as can be seen in the radial cross section of FIG. 3 and the axial cross section of FIG. 5, the thickness of blades 170 varies both radially and axially as blades 170 spiral down the length of hollow shell 111.

It should be noted that for the embodiment of FIGS. 1-7 and other preferred embodiments, the height of blades 170 may be substantially lower than, for example, a typical 3 bladed wind turbine because the continuous contact between the fluid and central body 110 as the fluid flows through channels 174 may prolong the energy transfer between the incoming fluid and energy conversion device 100. By contrast, the interaction between the fluid and a typical 3 bladed turbine is relative brief because of the short duration of contact. The height of blades 170 in some preferred embodiments may be similar to or less than the length of central body 110. The lower height of blades 170 may have a further advantage in that energy conversion device 100 may have lower vibration and noise characteristics in, for example, higher wind speeds than for a typical 3 blade turbine. Lower vibration and noise are highly desirable in wind turbine design and may enable mounting on structures such as residential or other rooftops where such mounting may not be feasible for conventional wind turbines.

For some preferred embodiments of the present invention, a number of dimensions of central body 110 and blades 170 can be scaled by the golden ratio, thereby emulating designs found in nature. The ratio of the length of central body 110 to the maximum diameter of central body 110 including blades 170 may approximate the golden ratio while the axial location of this maximum diameter may be determined by configuring the ratio of the axial distance from the maximum diameter to the back of central body 110 to the distance from the maximum diameter to the front of central body 110 as approximately the golden ratio. The ratio of the height of blades 170 to the base width of blades 170 may also be approximated by the golden ratio along the entire length of all blades 170. Similarly, the ratio of the angular displacement of each blade 170 to the remaining angular displacement of a full circle, i.e. 360° may be approximated by the golden ratio. The curvature of both CW facing wall 172 and CCW facing wall 173 may also be determined by scaling dimensions according to the golden ratio.

FIG. 8 shows an exploded view from an isometric perspective of energy conversion device 100 according to some preferred embodiments of the present invention. In addition to central axle 120, front end piece 130, first half body piece 150, second half body piece 160, dovetail slots 178, dovetail keys 190, the embodiment of FIG. 8 may include interior space 112, central shaft support/stiffener 121, first half front bearing assembly 151, first half rear bearing assembly 152, second half front bearing assembly 161, second half rear bearing assembly 162, and generator 180, although the invention is not limited in this respect. The interior space 112 of energy conversion device 100 may have sufficient capacity to include other elements such as for example, other structural elements, one or more energy storage devices such a battery 192 attached to the shaft stiffener, or other electronic elements not shown in FIG. 8.

In some embodiments of the present invention, central axle 120 may not be stiff enough to eliminate flexure during operation of energy conversion device 100. For these embodiments, central axle support structure 121 may act to increase stiffness. Central axle support structure 121 may also serve as an attach point for other structural or other functional elements.

Central axle 120 may be fixed, such that when interacting with a surrounding fluid, hollow shell 111 may rotate about central axle 120 in a CCW direction when central body 110 is viewed axially from the front for the embodiment of FIG. 8, although a configuration for which the opposite rotation is also possible. To accommodate the rotation of hollow shell 111, first half piece 150 may include first half front bearing assembly 151 and first half rear bearing assembly 152 while second half piece 160 may include second half front bearing assembly 161 and second half rear bearing assembly 162. When first half piece 150 and second half piece 160 are joined together at the dovetail slots 178 by the dovetail keys 190 shown on FIG. 5, both the front and rear bearing assemblies may form front and rear bearing assemblies or sets respectively that may surround central axle 120. Front end piece 130 and back end piece 140 may be attached to the connected first half piece 150 and second half piece 160 to complete hollow shell 111 that may rotate around central axle 120. Other embodiments may include different quantities of bearing assemblies. In yet other embodiments, each bearing assembly may comprise a unified ring with other structural elements for the attachment of hollow shell 111.

Generator 180 may be, for example, an axial flux generator or a radial flux generator although other generator types are possible. It is an advantage of the present invention to include a gearless generator such as generator 180 thereby eliminating the friction of a gearbox typical of some wind and hydro turbines presently in use. Lowering the resistance to rotation may enable central body 110 to commence rotating at a lower speed of incoming fluid than, for example, a typical 3 blade wind turbine with an external gearbox.

FIG. 9 depicts an exploded view of generator 180 in a preferred embodiment of energy conversion device 100 for which generator 180 may be an axial flux generator comprising a rotor 181 and a stator 185. In some preferred embodiments, rotor 181 may be attached to hollow shell 111 on either or both of first half piece 150 and second half piece 160 in such a way that rotor 181 rotates with the solid walled hollow shell 111 while stator 185 may be attached to central axle/shaft 120 and shaft stiffener 121. The rotor housing 182 shown has a contoured exterior wall to match the contour of the interior walls of the two body parts 112 and is held in place by the compression between both central body parts. The matching contour fixes the rotor in place, and the two body parts are further connected together by several snap-in dovetail key connectors and the two snap-in end caps. Due to the rotor housing being located in the widest part of the body which has the least pronounced contour, and the absence of shading, the contour is not readily visible in FIGS. 8 and 9. The fixed stator has a smaller diameter than the rotor so it does not make contact with the spinning body parts of the generator and is centered directly in front of the rotor and is attached to the thicker fixed shaft support/stiffener.

Rotor 181 may be comprised of rotor housing 182 attached to magnet back plate 183 and magnets 184. Furthermore, in some preferred embodiments of energy conversion device 100, rotor housing 182 may also provide structural support or be an element for attaching first half piece 150 to second half piece 160. Stator 185 may be comprised of stator housing 186 attached to coil back plate 187 and coils 188.

In the embodiment of FIG. 9, generator 180 is a three phase generator having 21 coils 188 and 20 magnets 184. Other combinations of the quantities of coils 188 and magnets 184 are also possible.

Figure 10:
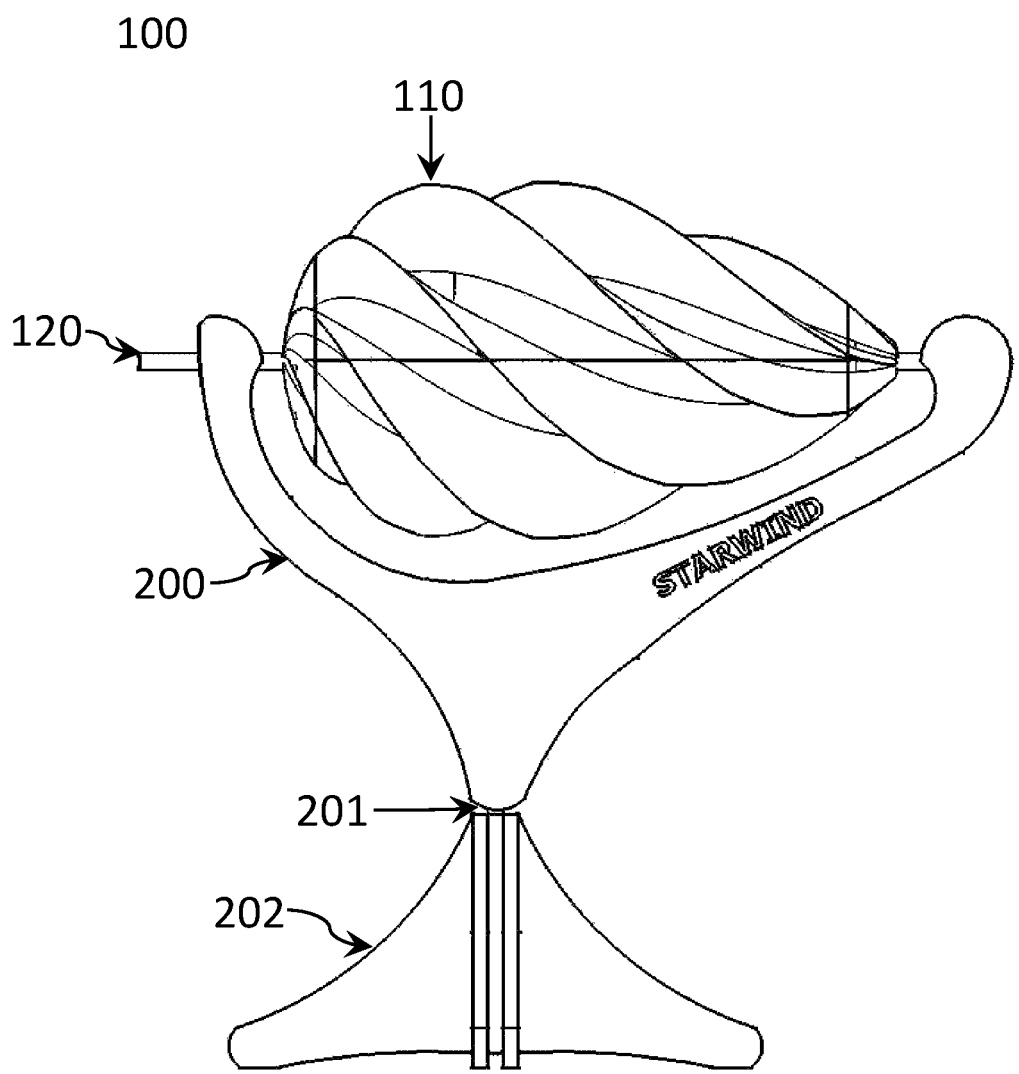
FIG. 10 shows an embodiment of the energy conversion device mounted in an exemplary configuration.

FIG. 10 depicts a side view of a preferred embodiment of energy conversion device 100 with central body 110 mounted on support structure 200 through central axle 120. The embodiment of FIG. 10 additionally comprises pivot bearing 201 and mounting structure 202. Support structure 200 may be C-shaped to match the exterior shape of central body 110 and may be further shaped to reduce any impact on the incoming fluid. In some embodiments, the rear section of support structure 200 may have a large surface area than the front section to enable energy conversion device to register into the approaching fluid by rotating around on pivot bearing 201 as, for example, a weather vane registers into the approaching wind. In some embodiments, pivot bearing 201 may also be configured to allow the transfer of power and possibly data across the junction between support structure 200 and mounting structure 202 as is known in the art. Mounting structure 202 may be mated to bearing 201 and may comprise a structure similar to that used for mounting satellite dishes and other antennae. Other mounting structures are also possible and are well known in the art.

In some embodiments, the presently described energy conversion device may be used to harness electrical energy to move a fluid with a motor instead of a generator. In these instances, a first part of the motor, the rotor, may be attached to the hollow shell and a second part of the motor, the stator, may be attached to the central axle. In such an embodiment, the support structure may be configured differently than shown in FIG. 10. For example, the support structure may only attach at one end of the energy conversion device when used as a propulsion system or a fan or related devices.

Figure 11:
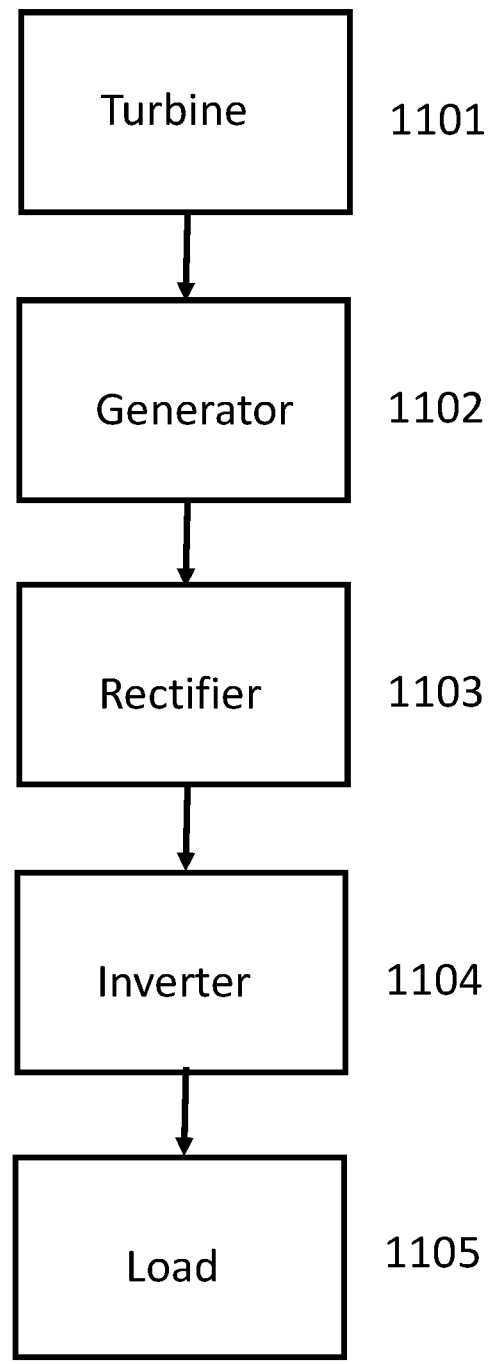
FIG. 11 illustrates a block diagram of the energy conversion device as part of a representative power supply system.

FIG. 11 shows a block diagram of a power supply system 1100 in an embodiment that may incorporate energy conversion device 100 for use as a turbine and generator system. Power supply system 1100 may comprise turbine 1101, generator 1102, rectifier 1103, inverter 1104, and load 1105. Turbine 1101 may be an embodiment of central body 110 when configured for use as for example, a wind or water turbine, and generator 1102 may be an embodiment of generator 180 configured to match turbine 1101. Rectifier 1103 and inverter 1104 may be a bridge rectifier and a direct current to alternating current power inverter respectively as are known in the art. In some embodiments, one or more of rectifier 1103 and inverter 1104 may also be housed in interior space 112 of hollow shell 111 along with generator 1102, although these elements may be external to central body 110 as well. Load 1105 may be, for example, a home's electric system, an electric grid, or other such system that may consume electric power.

Figure 12:
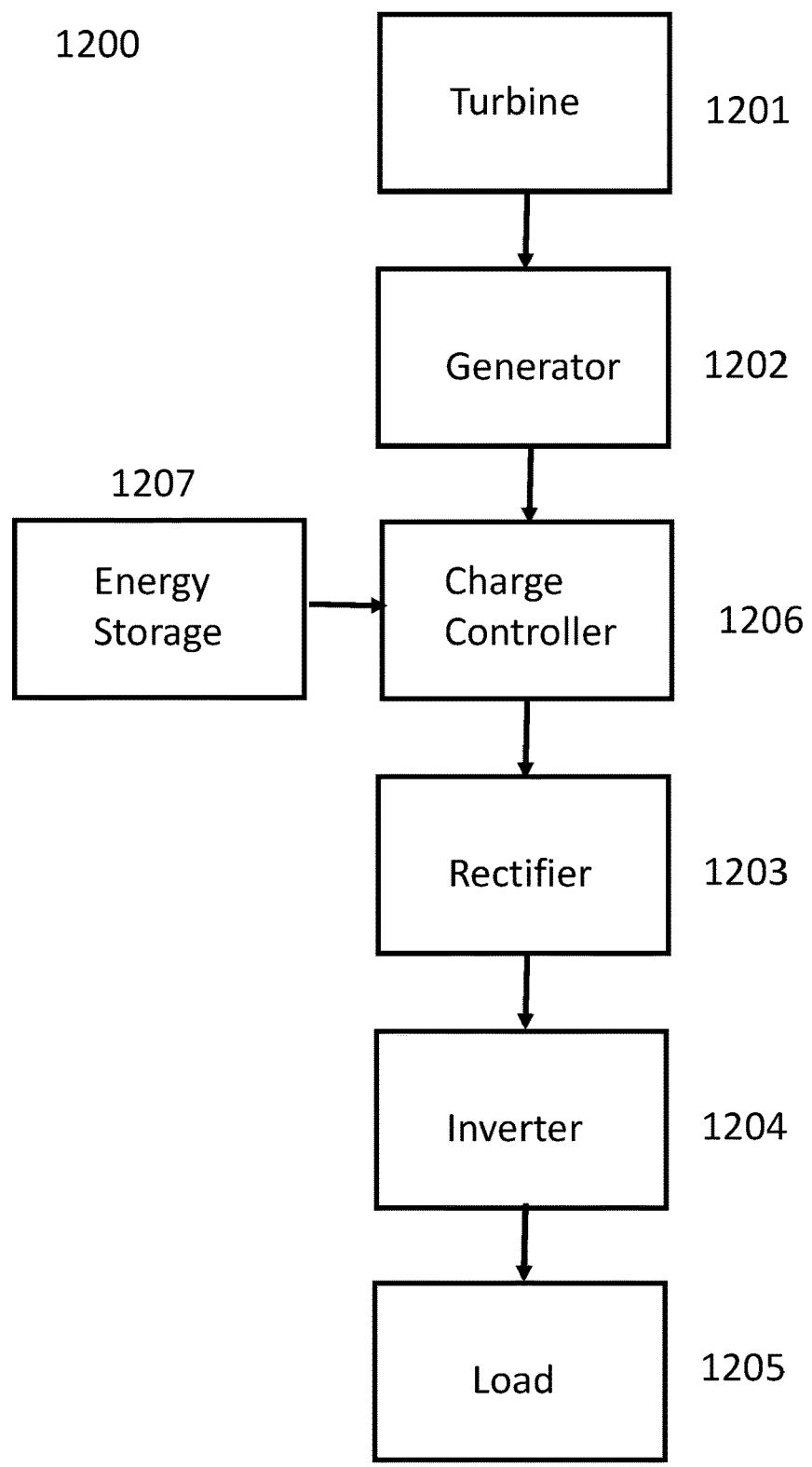
FIG. 12 illustrates a block diagram of the energy conversion device as part of a modified representative power system.

In some embodiments, a power supply system employing the present invention may include an energy storage device or system. FIG. 12 shows a block diagram of power supply system 1200 similar to power supply system 1100 modified with the addition of a charge controller 1206 and energy storage device 1207. Such systems are commonly in use today and may employ batteries, fuel cells, and other types of energy storage devices. In some embodiments, charge controller 1206 and energy storage device 1207 may also be housed in interior space 112 of hollow shell 111 or external to central body 110.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

What is claimed is:

1. An energy conversion device comprising:
   a teardrop shaped structure with 4 snap-together main exterior body parts consisting of;
      a snap-in solid front end cap, two symmetrical solid walled upper and lower teardrop shaped central body parts with dovetail slots and snap-in dovetail key connectors, hollow cavities facing one another, and a snap-in rear end cap
      multiple curved blades protrude from the exterior, spiraling the full length of each of the 4 main snap together parts
      additional electric and electronic components are housed in the cavity of the two central body parts.

2. The energy conversion device of claim 1 further comprising one or more bearing assemblies fixed to the solid walled hollow body to allow the solid walled hollow body to rotate about the axle.

3. The electric component of claim 1 further comprising:
a generator housed in the interior space of the solid walled hollow shell.

4. The electric component of claim 3 comprises:
   a generator housed between the walls of the hollow cavity of the 2 body parts;
   the generator further comprises a contoured exterior walled rotor;
   the rotor exterior wall has the same contour of the interior walls of the 2 body parts and is held in place by the compression between both central body parts.

5. The electronic component of claim 1 further comprises an energy storage device.

6. The energy conversion device of claim 5 wherein the energy conversion device is a battery attached to the shaft stiffener.

* * * * *